United States Patent
Maskatia et al.

(10) Patent No.: US 11,750,857 B1
(45) Date of Patent: Sep. 5, 2023

(54) SYSTEM AND METHOD FOR DELIVERING ALERTS

(71) Applicant: Edge Networks, Inc., Sun Valley, ID (US)

(72) Inventors: Imran Arif Maskatia, Palo Alto, CA (US); Benjamin James Kauffman, Ridgefield, WA (US); Thomas Lee Rich, Meridian, ID (US); Nicholas James Hottinger, Boise, ID (US); Michael J. Chase, Jr., New Boston, NH (US)

( * ) Notice: Subject to any disclaimer, the term of this patent is extended or adjusted under 35 U.S.C. 154(b) by 0 days.

(21) Appl. No.: 17/520,782

(22) Filed: Nov. 8, 2021

(51) Int. Cl.
*H04N 21/235* (2011.01)
*H04N 21/81* (2011.01)

(52) U.S. Cl.
CPC ....... *H04N 21/2355* (2013.01); *H04N 21/814* (2013.01)

(58) Field of Classification Search
CPC .................. H04N 21/2355; H04N 21/814
See application file for complete search history.

(56) References Cited

U.S. PATENT DOCUMENTS

| | | | | |
|---|---|---|---|---|
| 9,154,854 | B1* | 10/2015 | Straub | H04N 21/814 |
| 2007/0136743 | A1* | 6/2007 | Hasek | H04N 21/235 |
| | | | | 375/E7.025 |
| 2015/0256902 | A1* | 9/2015 | Fusco | H04N 21/25841 |
| | | | | 725/33 |
| 2020/0119847 | A1* | 4/2020 | Fay | H04H 60/13 |

* cited by examiner

*Primary Examiner* — Randy A Flynn
(74) *Attorney, Agent, or Firm* — Krishna Kalidindi

(57) ABSTRACT

A method of communicating an alert includes: encoding data received from a plurality of sources by a central content controller (CCC) and determining existence of one or more alerts. If no alerts exist, the encoded data is assigned as streams to subchannels. For existing alerts, a market area (MA) is determined and the alert is assigned as a stream to a data subchannel and the encoded data is assigned as streams to remaining subchannels. For each MA without an applicable alert, the encoded data is assigned as streams to the subchannels. The assigned data is transmitted to regional controllers (RCs) for broadcasting to the associated MAs.

20 Claims, 8 Drawing Sheets

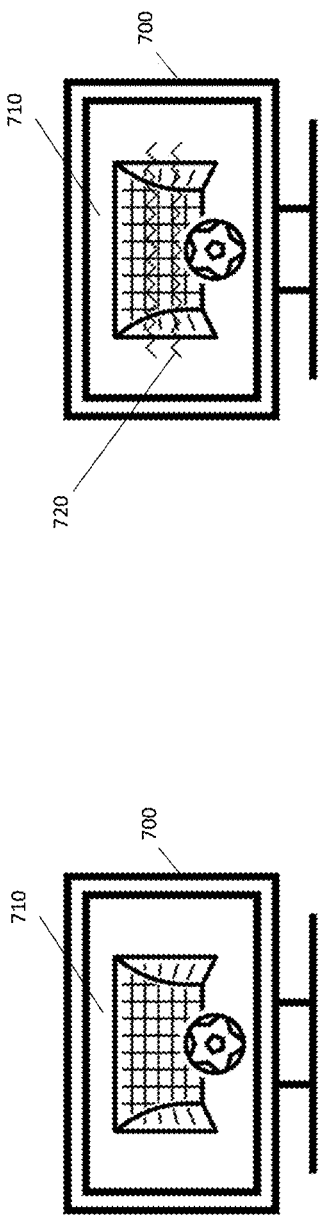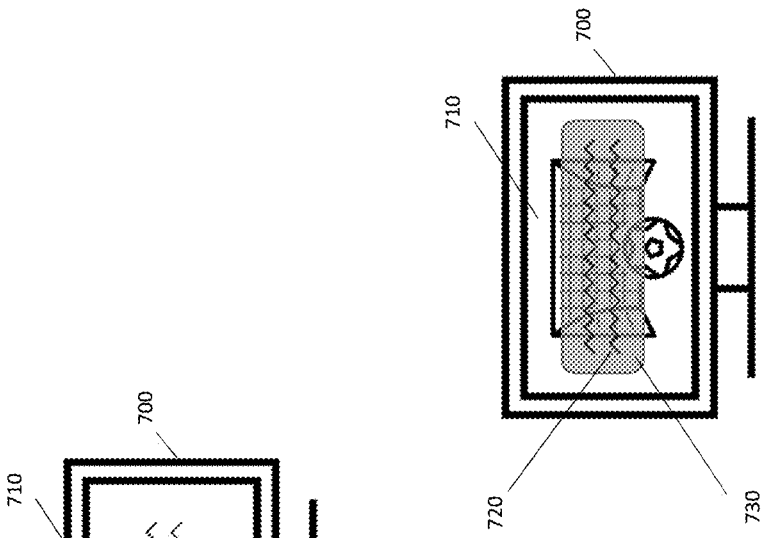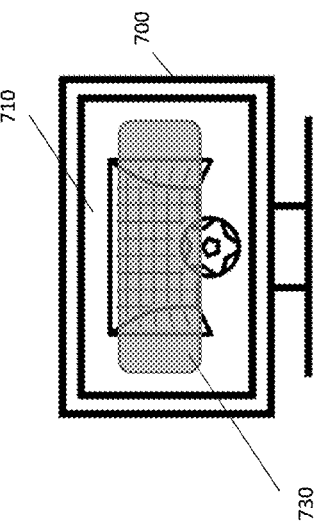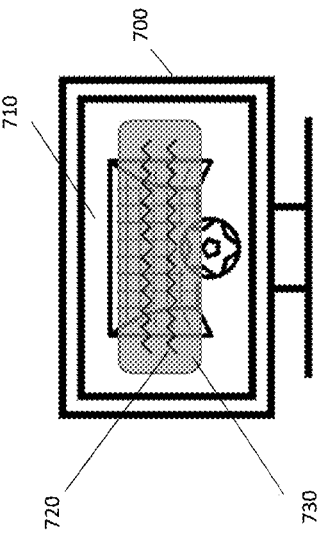
FIG. 7A
FIG. 7B
FIG. 7C
FIG. 7D

SYSTEM AND METHOD FOR DELIVERING ALERTS

CROSS-RELATED APPLICATIONS

The present disclosure is related to pending U.S. patent application Ser. No. 17/377,373 filed on Jul. 15, 2021, Ser. No. 17/508,215 filed on Oct. 22, 2021 and Ser. No. 17/508,221 filed on Oct. 22, 2021. The subject matter of each of these pending applications is incorporated in its entirety herein by reference.

BACKGROUND

This disclosure is directed to communication of emergency alerts. The use of Emergency Alert System (EAS) to communicate alerts is known. EAS replaced the Emergency Broadcast System (EBS) in 1997. EAS is designed to provide authorized officials the ability to communicate emergency alerts and warning messages to the public. These messages can be communicated via a broadcast antenna over the air (OTA) or by satellite to radio and television receivers.

A recently adopted television standard, ATSC 3.0 (Advanced Television Systems Committee) provides for the broadcast (over the air, OTA) of television signals an internet protocol (IP) format which is the format in which data is communicated over a broadband and/or internet connection.

OTA interface is a traditional communication path for broadcasting to all receivers within a physical viewing or receiving range. Transmission over a broadband (or network), on the other hand, can take place via unicast (one destination) or multicast (multiple destinations).

While EAS was designed to provide the President the ability to address the country in a national emergency via all radio and television stations, it has been used almost exclusively to communicate severe weather alerts such as tornadoes, flash floods, hurricanes, wildfires and AMBER alerts.

The EAS alerts can originate from local, state, or federal alerting authorities. The messages can be delivered as radio frequency (RF) signals such as AM/FM. The messages can also be delivered over the internet or via television (TV) broadcast stations. The alert can include a header, an audio signal, an audio message, a textual representation of the message an alert end signal (as well as various other metadata related to the alert).

In some systems, AV content may be encoded at a central location and communicated to local or regional areas for broadcast transmission. In these systems, a dedicated encoder is needed to encode EAS information at each broadcast transmission site for broadcast over the air (OTA).

Example embodiments of the present disclosure provides a more efficient, effective and reliable method for communicating alerts.

The terms "user", "viewer", "customer" and "consumer" are used interchangeably within this disclosure. A "viewer" and "viewer premises" are also used interchangeably. The terms "AV signals", "AV content", "AV program", "data files", "data" and "broadcast content" are also used interchangeably. The terms "communicated", "transmitted", "submitted" and "sent" are all used interchangeably to indicate the sending of data. The terms "existing" and "active" are also used interchangeably in referring to an alert. The terms "data channels", "data subchannels", "data streams", "data substreams" and "subchannels" are also used interchangeably.

SUMMARY

According to an example embodiment, a method of communicating an alert is disclosed. The method comprises encoding, by a central content controller (CCC), data received from a plurality of sources and determining existence of one or more alerts. If no alerts exist, the CCC assigns the encoded data as streams to a plurality of subchannels and transmits the streams to regional controllers (RCs) each associated with a respective market area (MA). If alerts exist, a MA for each of the one or more existing alerts is determined. For each MA having an active alert, the CCC assigns the alert as a stream to a data subchannel of the plurality of subchannels and the encoded data as streams to remaining ones of the plurality of subchannels. The CCC transmits the assigned streams to RCs associated with a respective MA for which the alert is applicable. For each MA without an applicable alert, the CCC assigns the encoded data as streams to the plurality of subchannels and transmits the assigned streams to RCs associated with respective MAs. The received streams are broadcast by the RCs to the associated MAs.

According to another example embodiment, a system for communicating an alert is disclosed. The system comprises a central content controller (CCC) and a plurality of regional controllers (RCs) each associated with a respective market area (MA). The CCC is configured to encode data received from a plurality of sources and determine the existence of one or more alerts. If no alerts exist, the CCC assigns the encoded data as streams to a plurality of subchannels and transmits the assigned streams to regional controllers (RCs) each associated with a respective market area (MA). If an alert exists, the CCC determines a MA for each of the one or more emergency alerts and for each MA having an active alert, the alert is assigned as a stream to a data subchannel of the plurality of subchannels and encoded data is assigned as streams to the remaining ones of the plurality of subchannels. The assigned streams are transmitted by the CCC to RCs associated with MAs for which the alert is applicable. For MAs without an alert, the CCC assigns encoded data to the plurality of subchannels and transmits the assigned streams to RCs each associated with a MA. Each of the RCs is associated with a respective MA and is configured to receive and broadcast the assigned streams to an associated MA.

BRIEF DESCRIPTION OF THE DRAWINGS

The several features, objects, and advantages of example embodiments will be understood by reading this description in conjunction with the drawings. The same reference numbers in different drawings identify the same or similar elements. In the drawings:

FIGS. 7A-7D illustrate a display device according to example embodiments;

DETAILED DESCRIPTION

Figure 1:
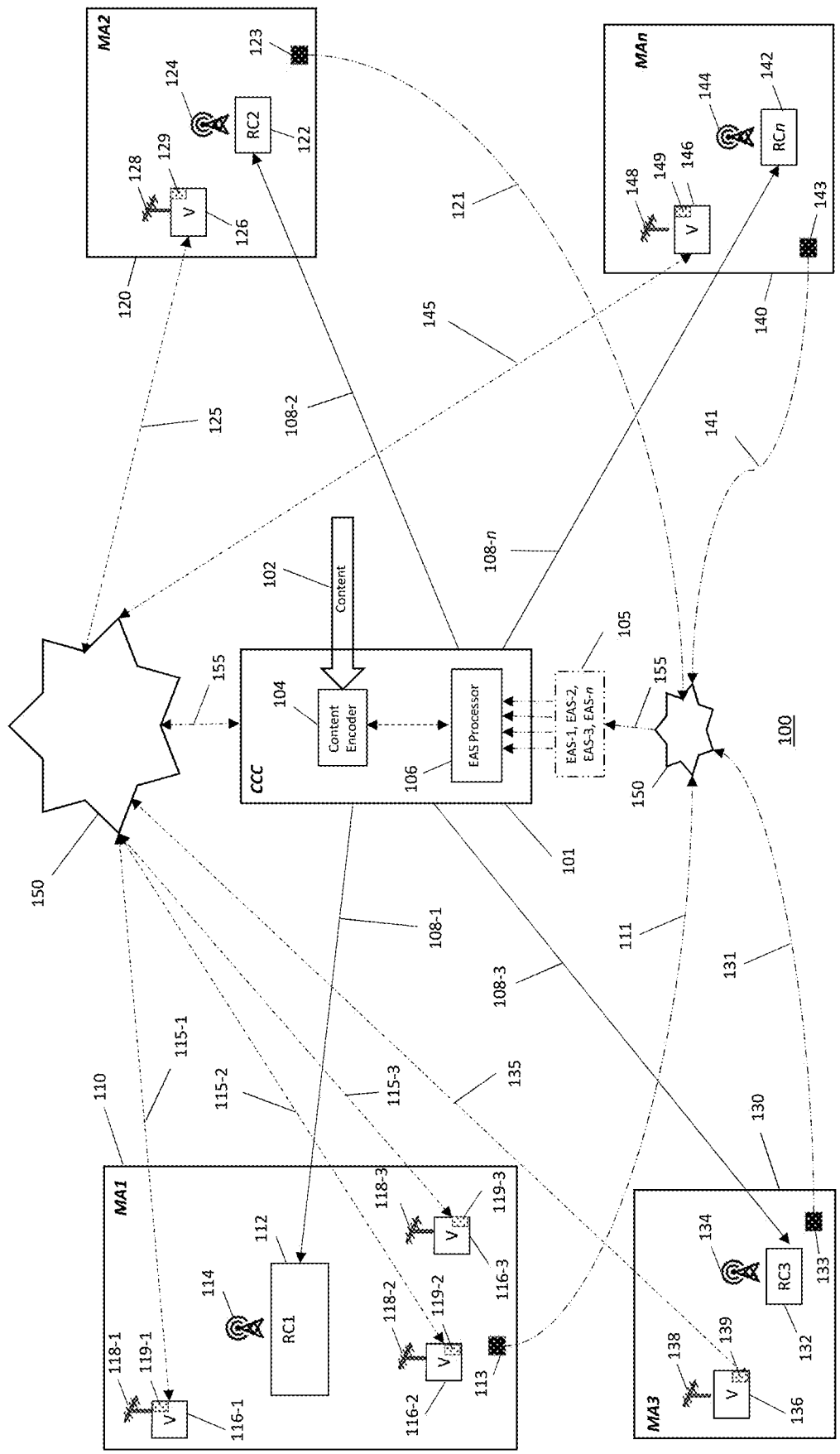
FIG. 1 illustrates a system according to example embodiments.

In the following description, numerous specific details are given to provide a thorough understanding of embodiments.

The embodiments can be practiced without one or more of the specific details, or with other methods, components, materials, etc. In other instances, well-known structures, materials, or operations are not shown or described in detail to avoid obscuring aspects of the example embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

According to example embodiments, methods and systems are disclosed for communicating EAS information without a dedicated encoder. Furthermore, alerts that are applicable to viewers in particular geographic, broadcast or market area may be communicated to those viewers from a location that is remote from (or, outside) the market area associated with the viewer.

A system in accordance with example embodiments may be described with reference to FIG. 1. System 100 may comprise a central content controller (CCC) 101. Viewers may be located in a plurality of market areas (MAs). A market area can be a broadcast coverage area or a geographic area. The physical size of a market area can vary from a few square miles to as much as over one hundred square miles. A MA can be a contiguous geographic area for example. In system 100 of FIG. 1, four such market areas 110, 120, 130 and 140 are illustrated. While four MAs are illustrated, this number is an example and the actual number of MAs can be higher or lower.

Each market area may have a regional controller (RC) associated therewith. RC1 (112) can be associated with MA1 (110), RC2 (122) can be associated with MA2 (120), RC3 (132) can be associated with MA3 (130) and RCn (142) can be associated with MAn (140).

Data or content (such as audio visual (AV) data/content for example) 102 from a plurality of sources may be received at CCC 101. The source of the data may be, but is not limited to, a national television network for example. The data may be received by CCC 101 over dedicated terrestrial or satellite networks or over the Internet 150. The received data may be encoded by encoder 104 of CCC 101.

Content encoder 104 may encode the received data 102 into an IP delivery form using a particular codec such as MPEG-2 or H.265 for example. The encoded data can be packetized and encrypted. In can also be packaged using MPEG Dash or HLS or MP4 for example.

The encoded data may be communicated as one or more streams (data streams or AV streams for example) by CCC 101 to one or more of a plurality of regional controllers (RCs) 112, 122, 132 and 142 (associated with market areas 110, 120, 130 and 140) over a corresponding communication medium or link 108-1, 108-2, 108-3 and 108-4. The communication medium can be a physical private network such as, satellite, microwave, terrestrial or fiber for example. The communication medium can also be a virtual private network (VPN) created over a public network such as the internet for example.

The medium (108-1, 108-2, 108-3, 108-4) over which the data streams are sent (or communicated) utilizing the internet protocol (IP) may be structured similar to a broadcast channel. In an example implementation, a broadcast channel may represent a 6 MHz slice of the radio frequency (RF) spectrum. The 6 MHz frequency bandwidth is specific for broadcasting in the US and in North America—it may be different in other jurisdictions. The data streams may be sent using Studio-to-Transmitter Link Tunneling Protocol (STLTP). The data streams may be multiplexed by a multiplexer (not illustrated) and exit CCC 101 via a broadcast gateway (not illustrated) and received by a RC. An exciter (not illustrated) at the RC may modulate the data streams onto an RF frequency and send the modulated data streams to the broadcast antenna for broadcasting to the market area in a known manner.

A RC can have an antenna associated therewith for broadcasting the data streams (as data or AV signals for example) over-the-air (OTA) to viewers in the corresponding market area (MA). That is, RC1 (112) can be associated with antenna 114, RC2 (122) can be associated with antenna 124, RC3 (132) can be associated with antennal 134 and RCn (142) can be associated with antenna 144.

The AV signals broadcast by the antenna can be received by viewers within reception range of the AV signals. In MA1 (110) for example, RC1 (112) broadcasts AV signals via broadcast antenna 114. Viewers 116-1, 116-2 and 116-3 within MA1 (110) can receive the AV signals broadcast by antenna 114.

A viewer 116-1 may receive the AV signals via an antenna 118-1 associated with the viewer premises for example. That is, antenna 118-1 can be associated with viewer 116-1, antenna 118-2 can be associated with viewer 116-2 and antenna 118-3 can be associated with viewer 116-3.

The received AV signals can be decoded and processed for presentation to a viewer by a device such as a set-top-box (STB) 119-1 for example. A viewer and associated STB can be associated with a viewer premises such as a home or an office, etc. That is, STB 119-1 can be associated with viewer 116-1 and antenna 118-1, STB 119-2 can be associated with viewer 116-2 and antenna 118-2 and STB 119-3 can be associated with viewer 116-3 and antenna 118-3.

In MA2 (120), RC2 (122) can broadcast AV signals via broadcast antenna 124 for reception by viewer 126 via antenna 128 and processing by STB 129. A similar arrangement is illustrated for the remaining market areas such as MA3 and MAn.

For illustrative purposes, three viewers 116-1, 116-2 and 116-3 are shown as being located in MA1 (110) and within a reception range of the AV signals from broadcast antenna 114 of RC1 (112). One viewer (126, 136 and 146) is illustrated as being located in each of MA2 (120), MA3 (130) and MAn (140). However, the number of viewers within a MA is typically much higher. In some scenarios, a viewer can receive broadcast AV signals from RCs corresponding to multiple MAs due the viewer being located in a physical area where broadcast AV signals from adjacent MAs can overlap.

A viewer (116-1, 116-2, 116-3, 126, 136 and 146) within system 100 utilizing an associated STB can also be connected via a broadband connection (115-1, 115-2, 115-3, 125, 135 and 145) to CCC 101 over the Internet or the cloud 150. CCC 101 may be connected to the Internet 150 via a communication link 155.

The encoded data streams received by the RCs may be broadcast to viewers (or viewer premises) within the associated market area (MA) in the manner described above. A RC can receive signals from CCC that can include, for example, television programming for a plurality of channels operating on one or more associated frequencies. Each of the frequencies can include a plurality of subchannels in a digital broadcast system.

In order to transmit emergency alerts (EAS) in existing systems, the RC (that receives an alert) is required to maintain an encoder for each channel of programming corresponding to a particular frequency that is broadcast via the (RC's) associated antenna. Example embodiments obviate this need for dedicated encoders by processing and routing the alerts at a central location (such as at CCC 101).

Under ATSC 3.0, television signals may be broadcast utilizing the internet protocol (IP). The format used is the same format used for communicating data over a broadband and/or internet connection.

Referring to FIG. 1, in addition to receiving data or content 102, CCC 101 may also be configured to receive EAS alerts 105. Such alerts may be received from the plurality of MAs (MA1-MAn).

Alerts generated by the various entities/authorities (within a MA) may be "gathered" by an EAS alert receiver and provide a single source of alerts to down stream systems. One such receiver is a DASDEC™ device from Digital Alert Systems, Inc. of Lyndonville, N.Y.

The alerts may be in the form of text files (such as in .xml format) and an audio stream. The receiver may normalize the alert data that can be received in different formats. The receiver can provide the alert data as textual metadata and an audio stream. The metadata can include Federal Information Processing (FIPS) codes which provide a level of granularity to a county or sub-county level in which an alert may be applicable.

In example embodiments, such a receiver can be configured to communicate the alerts to the CCC via an internet connection. A receiver, such as receiver 113 of MA1 (110), can communicate alerts for MA1 to CCC 101 via a communication link 111 over the Internet 150. Similarly, devices 123 of MA2, 133 of MA3 and 143 of MA2 can communicate alerts for the respective MAs to CCC 101 via the respective communication links 121, 131 and 141 over the Internet 150. CCC 101 may be connected to the Internet 150 via a communication link 155.

In FIG. 1, Internet 150 and communication link 155 are shown in duplicate (above and below CCC 101) to reduce clutter in the illustration.

The EAS alert received from receiver (such as from 113 for example) may be processed by EAS processor 106 of CCC 101. The MA to which the received EAS alert is applicable may be determined. The text portion of the alert may be parsed into data variables representing the various parameters of the alert such as, for example, description, type, time and location. The FIB codes may then be mapped to their relevant market areas. The audio for the alert can either be a file or a linear stream. The audio may be converted to a format that can be played on the STB such as DASH or MP3 for example. The formatted audio may be placed in a data broadcast (OTA) stream for delivery to the STB and on a Content Delivery Network (CDN) for internet delivery. If it is a linear audio stream, it can be converted into an audio-only broadcast (OTA) subchannel.

Content encoder 104 within CCC 101 may check with EAS processor 106 of CCC 101 to determine if an EAS alert is in effect. The functionality described above (content encoding/converting, EAS processing for example) can be performed by a processor associated with CCC 101.

Figure 2:
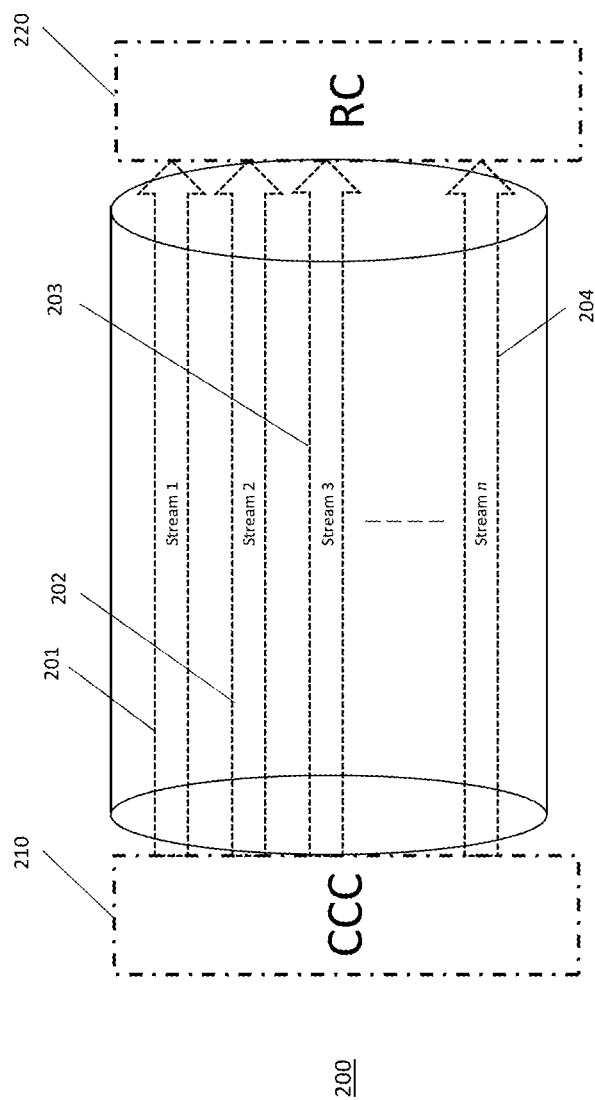
FIG. 2 illustrates a communication link according to example embodiments.

An example communication link, such as 108-1 . . . 108-n, may be described with reference to FIG. 2. Communication link 200 may comprise a plurality of data channels 201, 202, 203 and 204 (associated with one frequency for example). A physical broadcast channel can consist of one or more audio-video (A/V) streams, audio-only streams and data streams as well as additional signaling information. Each of these channels can carry a data stream such as data Stream 1, Stream 2, Stream 3, . . . , Stream n. The data stream can be A/V, audio-only and/or data only (i.e. no video or audio).

In this context, the phrase "Data only" may refer to a stream where the tuner does not search for and play video or audio components of the stream but makes the data on the stream available to other processes on the set-top box for consumption. As such, the bandwidth requirements for a data only channel can be less than those for A/V, video, audio, etc. Each of these channels can also be referred to as subchannels (may also be known as digital subchannels as they are included/implemented in a digital broadcast system). A stream may correspond to a linear list of programs (a "lineup" or "channel") for example. Separate streams, therefore, may contain separate programs.

Communication link 200 may correlate to a 6 MHz broadcast channel for example. The link may provide the medium for communicating a data stream (or streams) representing the information broadcast on the frequency in a STLTP format. The number of subchannels and streams can vary based on transmission parameters such as modulation and code rate that facilitate adjusting of the signal characteristics such as range, strength and the like. Only four such subchannels and streams are illustrated as an example.

In one implementation example, the broadcast channel bandwidth of 6 MHz may correspond to approximately 40 Mbps for a specific combination of transmission parameters. If a 4K stream is encoded at 20 Mbps (per stream) for example, two such streams can be included (for 40 Mbps). If a 720p stream is encoded at 2 Mbps (per stream) in another example, twenty such streams can be included. A combination of streams with varying rates can also be included. Using a combination of these example, one 4K (at 20 Mbps) stream and ten 720p (2 Mbps each) streams can be included.

In a "normal" operation, without any alerts (emergencies for example), a plurality of encoded data streams can be transmitted over link 200. Each stream (A/V, audio-only, or data) can be assigned to a separate subchannel. Stream 1 can be transmitted over subchannel 201, stream 2 on subchannel 202, etc. The streams can be transmitted or "sent" by CCC 210 and received by RC 220. The receiving RC can then transmit the received streams via an associated broadcast antenna to the market area corresponding to the RC.

Figure 3:
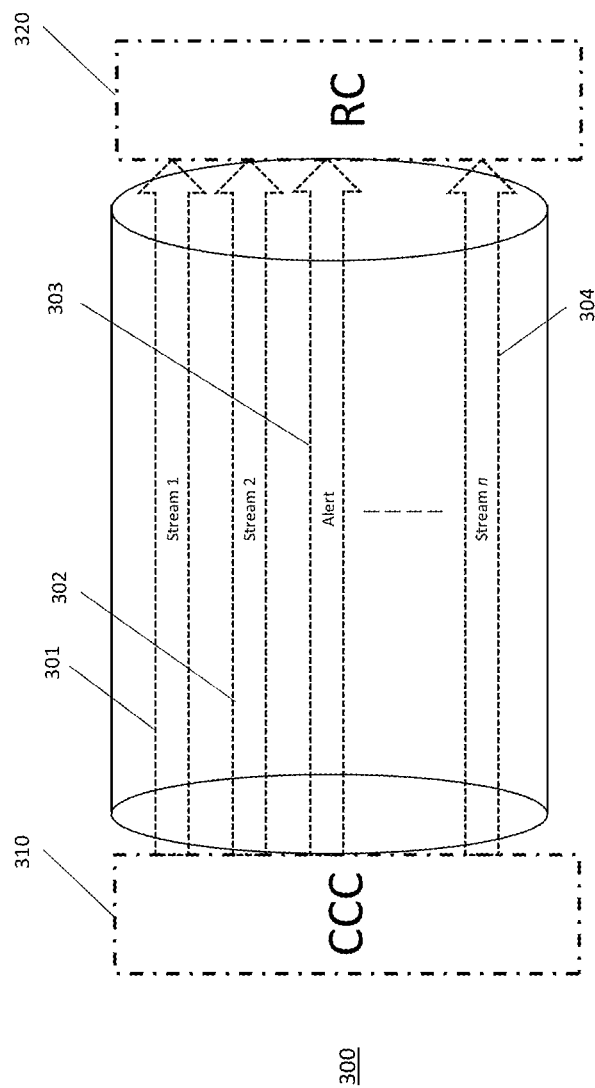
FIG. 3 illustrates a communication link according to example embodiments.

If, on the other hand, one or more alerts is received by CCC 101 (of FIG. 1) from one or more of alert receivers 113, 123, 133 and/or 143, the alert may be sent over one of the subchannels. The subchannel carrying the alert may be a data subchannel. As illustrated in FIG. 3 for example, communication link 300 may include data subchannels 301, 302, 303 and 304. In link 300, the alert may be sent over subchannel 303 while other data streams (i.e. not alerts) may be transmitted over the remaining subchannels 301, 302 and 304. The alert could be sent on any of the subchannels and is not limited to subchannel 303. The streams and alert can be sent by CCC 310 to RC 320 for broadcast over the air to the market area associated with the particular RC.

A method in accordance with example embodiments may be illustrated with reference to FIG. 4. In method 400, the CCC (such as CCC 101 of FIG. 1) may encode content (e.g. AV content) that is received by CCC 101 from a plurality of sources at 410.

A determination may be made at 420 as to whether any alerts have been received from one or more of receivers 113, 123, 133 and 143 (i.e. whether any active alerts exist). If no alerts are active, the encoded content may be assigned as streams (data, video, audio and/or AV for example) to subchannels at 430. The streams may be transmitted by the CCC to RCs at 440.

If, on the other hand, an active alert exists (i.e. at least one alert), a determination may be made at 450 as to how many alerts exist and the market areas (MAs) to which the alerts are applicable. In some instances, an alert (i.e. a single alert) may be applicable to multiple MAs.

For each MA with an alert, the alert may be assigned to one of the subchannels while concurrently, non-alert content may be assigned to the remaining subchannels at 460. The subchannel to which the alert is assigned can be a data only channel. In some example embodiments, a particular subchannel can be designated as "data only". In this regard, this subchannel can be a dedicated subchannel that is dedicated to carrying an alert. If a single alert is applicable to multiple MAs, the alert may be assigned to the data subchannel directed to the multiple MAs.

For MAs without an alert (while at least one MA has an alert so that the process 400 proceeds via the "Y" path at step 420), the content may be assigned as streams to the subchannels at 460. An alert may also be encoded/formatted prior to being assigned to a subchannel as a stream (not illustrated).

The streams assigned to the subchannels in steps 460 (in addition to the assigned streams of step 430) may be sent by the CCC to the respective RCs at 440. The receiving RC may then broadcast the content in the subchannels over the air (OTA) to the corresponding MA at 470.

In system 100 of FIG. 1 for example, an alert may be received by CCC 101 from device 113 of MA1 (110) via network links 111, 150 and 155. In this example, no other alerts (from other MAs) are received by CCC. CCC 101 may transmit the data streams over (all) the subchannels to RC2, RC3 and RCn as the alert is not applicable to MA2, MA3 and MAn. Since the alert is applicable only for MA1, CCC 101 may transmit the alert over one of the subchannels while transmitting data streams over the remaining subchannels to RC1.

Figure 4:
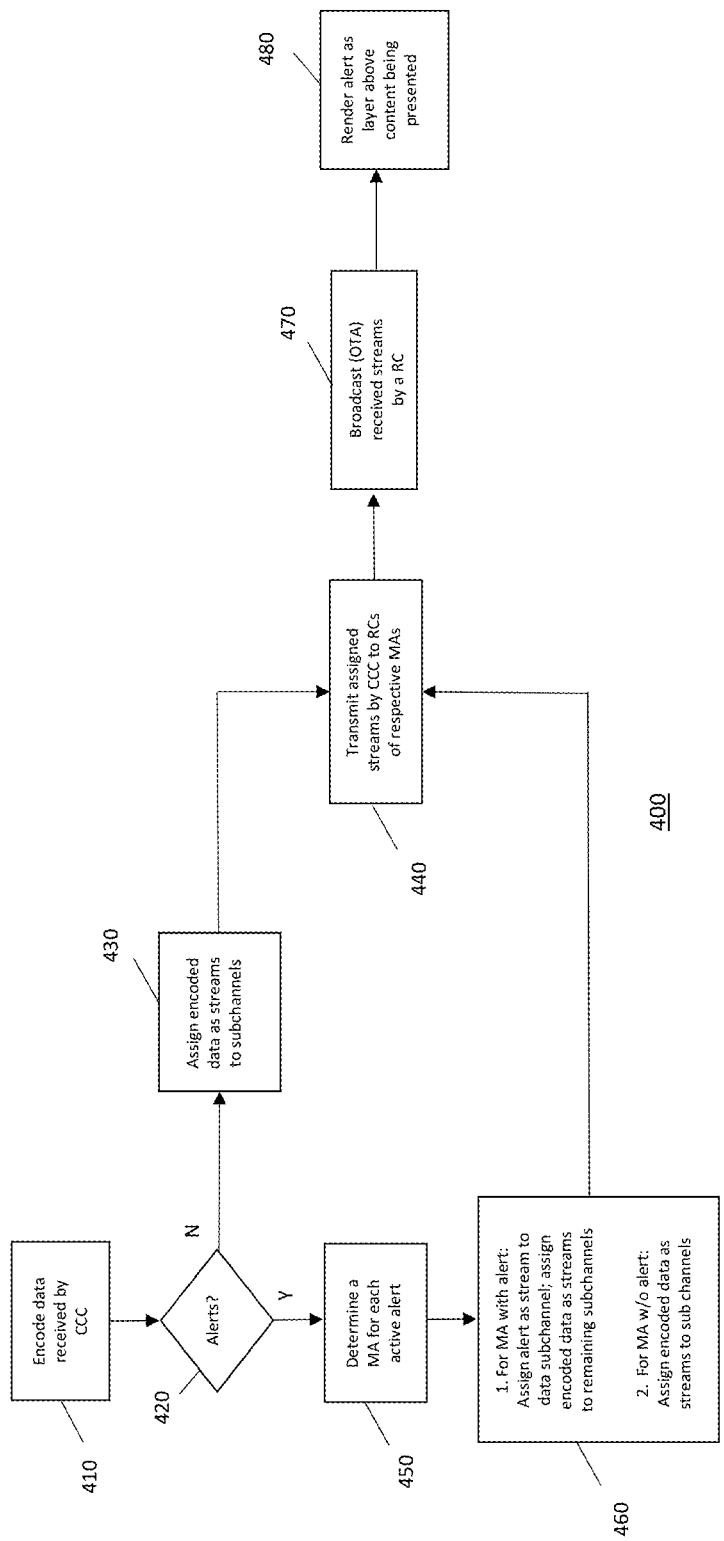
FIG. 4 illustrates a method according to example embodiments.

Method 400 of FIG. 4 may follow the "Y" path if at least one alert is active. If, subsequently, the previous alert is no longer active (the period or timeframe of the alert has expired for example), the method may switch to the "N" path. Conversely, the method may follow the "N" if no alerts are active and subsequently, if an alert becomes active, the method may switch to the "Y" path.

If the data received on one of the subchannels at a RC is an alert, the RC does not need to utilize a separate encoder at its (i.e. RC1 of MA1 in the example described above) broadcast antenna location. The alerts may be processed by the set-top-boxes (STBs) at each of the viewer premises within a MA within an active alert.

The alert information communicated from CCC 101 to applicable RC(s) can also include a universal resource locator (URL) where an audio portion of the alert (a file or a livestream) may be located that can be accessed by the STB over the internet connection. The audio portion can also be transmitted over another subchannel (separate from the subchannel carrying other portions of the alert). The subchannels are all operating on one (the same) frequency.

The alerts received by STBs may be rendered as a separate layer by the STB and presented over other AV content that is being presented to a viewer at 480. The user may set preferences on how the text portion of the alert may be "overlaid" above the displayed content. The preferences may include, but not limited to, text font, text size, text color, location on display where the alert is to displayed, etc. The audio portion can be mixed in or replace the audio corresponding to the content being viewed. In order to play the audio portion of the alert, the content being viewed has to be broadcast on the same frequency as the alert (in separate subchannels).

Figure 5:
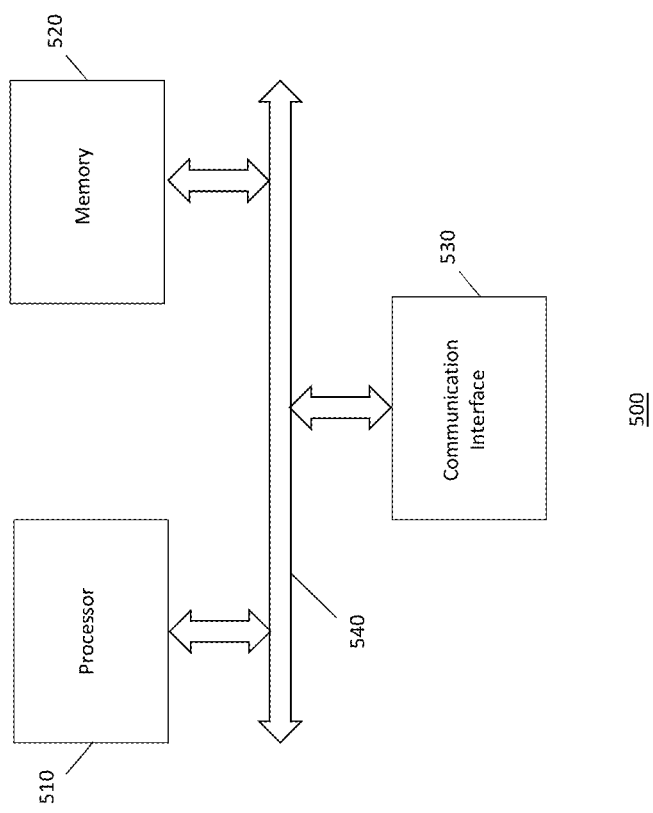
FIG. 5 illustrates a central content controller according to example embodiments.

A central content controller (CCC) in accordance with example embodiments is illustrated in FIG. 5. CCC 500 may include, but is not limited to, a processor 510, a memory 520, a communication interface 530 and a system bus 540 for interconnecting these components in a known manner. CCC 500 can be a general purpose computing device. A processor or memory can also refer to a plurality of processors or memory devices.

Processor 510 may incorporate the functionality of content encoder 104 and EAS processor 106 of FIG. 1 for example. It may encode content as described at step 410, check for existence of alerts as described at step 420, determine the MA at step 450 and assign data streams to subchannels at steps 430 and 460 of FIG. 4 for example.

Interface 530 may provide communication between CCC 500 (or CCC 101 of FIG. 1) and the plurality of RCs 112, 122, 132 and 142 in their respective MAs 110, 120, 130 and 140 via paths 108-1, 108-2, 108-3 and 108-4 for example. The paths may be dedicated private network(s) for example.

Interface 530 may also facilitate communication between the CCC 101 and STBs 119-1, 119-2, 119-3, 129, 139 and 149 (of FIG. 1) via the Internet 150. Interface 530 can also facilitate reception by CCC 101 of the alerts (EAS-1, EAS-2, EAS-3 and EAS-4 for example) from receiver(s) 113, 123, 133 and 143 via respective paths 111, 121, 131 and 141. Interface 530 may provide the communication (i.e. transmit) as described above in step 440.

CCC 500 may have AV content stored within memory 520. Memory 520 may also store any other information necessary for facilitating the functionality of CCC 101. This may include, but not limited to, content received from multiple sources, information received from the STBs, alerts received, list of market areas, routing information to communicate with RCs and instructions for encoding and assigning data streams to subchannels for example.

A RC can also comprise a processor, a memory, a communication interface and a bus interconnecting these components as described with reference to a CCC. Utilizing these components, the RC can receive content from CCC and broadcast the content over the air (OTA).

Figure 6:
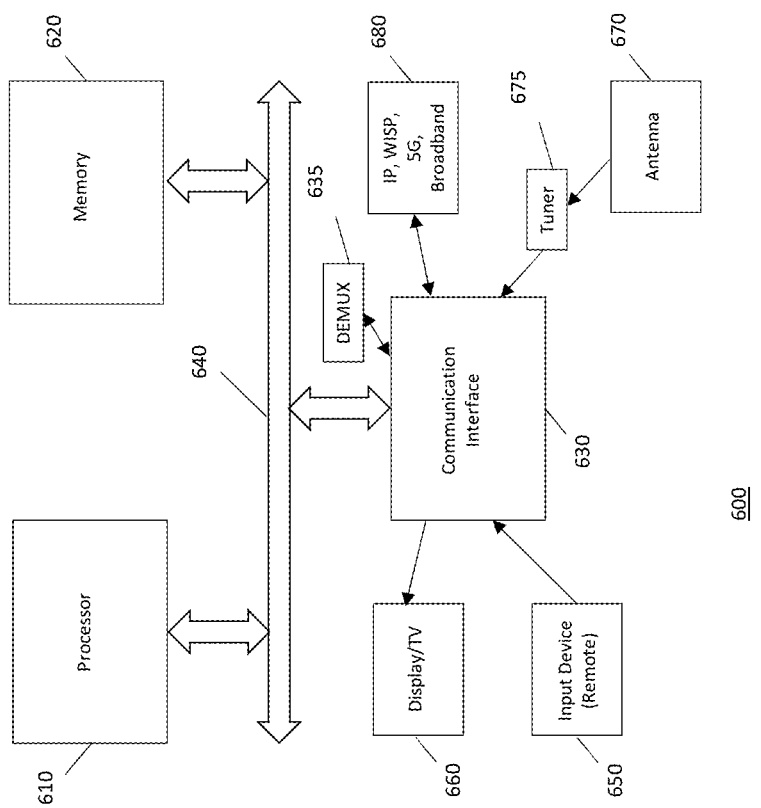
FIG. 6 illustrates a set-top-box (STB) according to example embodiments.

An example device associated with a viewer such as a set-top-box (STB) in accordance with example embodiments is illustrated in FIG. 6. STB 600 (labeled as 119-1, 119-2, 119-3, 129, 139 and 149 in FIG. 1) may include, but is not limited to, a processor 610, a memory 620, a communication interface 630 and a system bus 640 for interconnecting these components in a known manner. The STB may also be referred to as a user device.

Communication interface 630 may receive viewer inputs via a remote control or a keyboard or other such input device 650. Interface 630 may receive data streams on the subchannels via an antenna 670 (if signal is broadcast/broadcast multicast for example) or over an ISP gateway/modem 680. STB 600 may also comprise a tuner 675 for tuning into the various broadcast frequencies. STB 600 may also comprise a demultiplexer (DEMUX) 635 for demultiplexing the received streams.

Interface 630 may also provide communication with a display or monitor (e.g. TV) 660 for displaying AV content. The display may have audio output for playing the audio component of an AV file. Interface 630 may also communicate data with CCC 101 of FIG. 1. The data may include viewer input indicating viewer preferences such as content selection for the type programming that can be communicated to the viewer example. Memory 620 may store the received streams (i.e. recording) for viewing at a time chosen by the viewer.

The "hints" referred to above may provide additional instructions or specifics to STB 600 (or, one or more of STBs 119-1, 119-2, 119-3, 129, 139 and 149 of FIG. 1 for example) for presenting the alert to a viewer. They may include, for example, color and font of the alert to be displayed.

Processor 610 may process the signals received via antenna 670 for presentation on display 660, various inputs from a user/viewer input device 650 and the alerts received in the subchannels from one or more of the RCs 112, 122, 132 and 142.

Processor 610 may convert the alerts into a form suitable for presentation in an overlaid form over content being presented to the viewer. The content may be presented in a translucent or opaque manner. If the tuner (of the STB) is set to the frequency on which the alert is broadcast, then the alert can be presented to a viewer even if the viewer is not viewing AV content being received on the same frequency. The viewer may, for example, be viewing previously recorded AV content or may be using the display for gaming purposes.

If the display device is not powered on, the alert may also be utilized to initiate a signal from the STB to instruct the display device to switch on and a subsequent signal to switch inputs to the TV so that the input connecting the STB to the TV is activated. The signaling between the STB and the TV may be carried over a High Definition Multimedia Interface (HDMI) cable connecting the STB to the TV for example. Such signaling can also be utilized to switch inputs to the display device if the viewer is paying a game on the display. The tuner has to be tuned to the frequency on which alerts are being received.

The STB could be any reception device. It need not be limited to a typical hardware device as highlighted above. It can be any device (or software) that comprises, but not be limited to, a processor, storage, internet connection and broadcast reception. It can be a mobile phone, a tablet, a laptop, a desktop or the like. It can be an application (or an "app") running on any of these devices. A component (or software module) may be a single device or be constituted as multiple devices (such as network-attached storage, etc.).

Content presented to a viewer via a display device, such as display device 650, according to example embodiments may be illustrated with reference to FIGS. 7A-7D. A viewer may be presented content 710 (such as a soccer game for example) on display device 700 as illustrated in FIG. 7A. An audio alert, such as audio alert 720, may be presented to the user over (or in conjunction with) content 710 on device 700 as illustrated in FIG. 7B. A video alert as an overlay, such as overlay 730, may be presented to the user over content 710 on device 700 as illustrated in FIG. 7C. An audio alert 720 and video alert overlay 730, may be presented to the user over content 710 on device 700 as illustrated in FIG. 7D.

Figure 8:
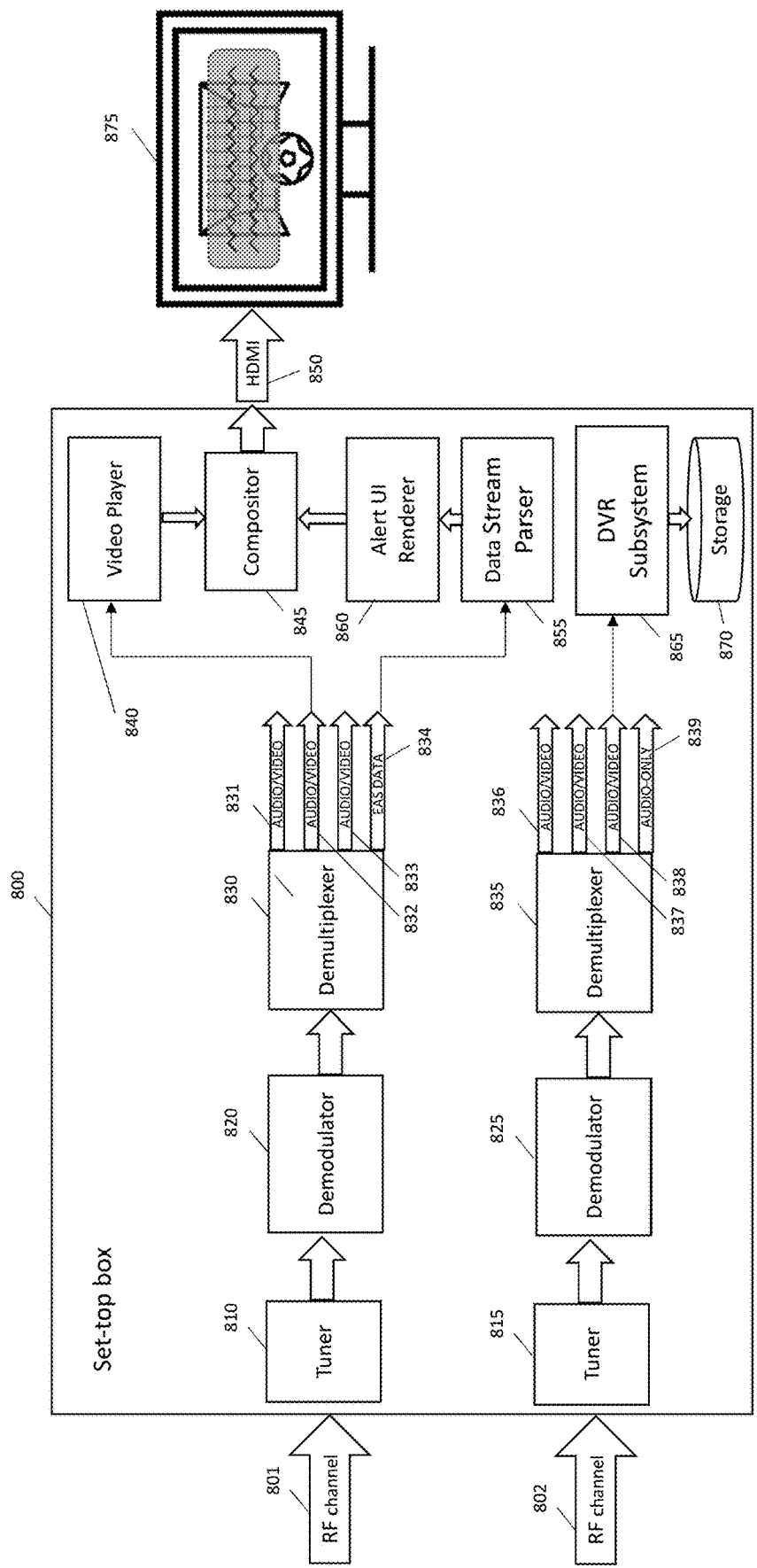
FIG. 8 illustrates a user device according to example embodiments.

An example embodiment of a user device such as a STB is illustrated in FIG. 8. STB 800 may receive signals for a plurality of channels such as RF channels 801 and 802. Each of these channels may correspond to a particular frequency. The signals may be broadcast by a RC as described above. While STB 800 is illustrated as including multiple tuners (two in this case), it can include one tuner or many (i.e. ≥2) tuners. Tuner 810 may be tuned to the frequency on which RF channel 801 is being broadcast. Tuner 815 may be tuned to the frequency on which RF channel 802 is being broadcast.

The signals received by tuner 810 may be demodulated by demodulator 820 and demultiplexed by demultiplexer 830 into a plurality of streams 831, 832, 833 and 834. These streams may correspond to subchannels (operating on one frequency). A viewer may be viewing A/V content presented on subchannel 832. The A/V stream on subchannel may be processed by a video player 840 and composited by compositor 845 and communicated via a high definition multimedia interface (HDMI) 850 to display 875.

If an alert is included on a data subchannel as stream 834, the alert may be processed by data stream parser 855 and rendered by alert user interface (UI) renderer 860. The rendered alert may be composited with output of video player 840 by compositor 845. The composited data may be communicated via a HDMI 850 to display 875. If no alert is active, only the A/V stream of 832 may be presented as illustrated in FIG. 7A. If an alert is active (both video and audio), then the alert of data subchannel 834 may be overlaid on A/V content of subchannel 831 as illustrated in FIG. 7D.

The signals processed by second tuner 802 may also include streams 836, 837, 838 and 839 from a plurality of subchannels. Each of these streams can be presented on display 875 as described above (via video player 840, compositor 845 and HDMI 850) or one of these streams can be recorded by DVR subsystem 865 and stored in memory 870 for a later viewing. One of the plurality of tuners can be set to be always "on" in order to receive alerts or other information regardless of whether the user is viewing broadcast content or using the display for other purposes such as being connected to subsystem 865 or playing a video game for example. The use of dedicated tuners is described in U.S. patent application Ser. No. 17/377,373.

Example embodiments as described may not be limited to presenting alerts over a display such as a TV. The STB of a viewer can access the viewer's location if the viewer is not present at his or her premises. The STB can communicate with the user's computing device (such as a computer or a mobile phone) that may be paired with the STB via a network protocol such as Bluetooth for example.

A viewer may wish to record the received data streams (e.g. AV) for later viewing. Since the STB (e.g. 119-1 of FIG. 1) receives AV data streams in subchannels that are different than the subchannels in which alerts are received, the alerts may be stored at a separate memory location (separate from where the AV data stream is stored). The alerts may be removed from memory at the expiration time of the alert. When the viewer watches the archived or recorded content, the STB may "overlay" the alert if the alert is still active (i.e. still stored in memory). In this manner, if the recorded content is being viewed at a later time and the alert is inactive at this time, the alert may not be displayed.

The reception and presentation of alerts may not be limited to STBs. The alerts can be received by any device having an ATSC tuner. Such tuners can be built into cars even if the cars do not have a TV or a video display device. The audio portion of the alert can be played over the car radio and/or speakers. If the car does have a video display, such alerts can be presented on the display. An operator of the vehicle can even be guided to avoid areas in which an alert is applicable. ATSC tuners can be built into home appliances, etc. The signals broadcast over the air can be received by the ATSC tuners that may be tuned to the frequency on which the alerts are broadcast.

Features and functionality associated with example methods and systems as described above may be implemented via software instructions executing on one or more processors of one or more general purpose computing devices or computing systems for example. By processing active alerts using processing resources of a STB, example embodiments obviate the need for having separate, dedicated encoders at the broadcast location (i.e. RCs 112, 122, 132 and 142 in system 100 of FIG. 1).

The alert received at the CCC from receiver 113 may include, but is not limited to, Alert short description, Alert message (in multiple languages), start and stop times, source (FEMA, etc.), geographic area (FIPS code), Type of alert (test, presidential message, weather alert, amber alert, etc), audio location (URL), audio format (MP3, WAV, etc.), audio type (file or stream), various IDs, whether to wake up the TV/STB or not (if supported) and any additional media (pictures, maps, documents, videos, etc.).

The alert information received by the STB may include, but is not limited to, alert text, audio location(s) (OTA or OTT, file or stream), additional media (if supported), formatting hints (based on type of alert . . . i.e. translucency, fonts, colors, layout, dismissibility) and start and stop times.

While the disclosure highlights AV content, example embodiments are not restricted to processing and presenting such content. Any type of data can be processed and presented utilizing aspects of the example embodiments described herein. In example embodiments, a particular subchannel or subchannels may be dedicated for communicating and broadcasting an alert. In case of broadcast malfunction, the alerts can be received via the internet connection between CCC 101 and the STBs (116-1, . . . 126, etc.) as described in co-pending U.S. patent application Ser. No. 17/508,221. If an identical alert is received via both the OTA interface and via the broadband/internet connection (such as 115-1 of FIG. 1 for example), the STB (such as 119-1 of FIG. 1) can determine which of the (identical) alerts are to be presented while the remaining alert(s) is/are to be discarded. The alert received first may be presented while the one received next may be discarded or stored for example. In some instances, the alert via OTA may be received before the alert via the broadband while in others, the alert via the broadband maybe received before the OTA alert. If an OTA alert is interrupted or fails, the broadband alert can replace the unreceived or all portions of the OTA alert. Similarly, an OTA alert can replace all or unreceived portions of the broadband alert.

Although example embodiments have been disclosed, it will be apparent to those skilled in the art that various changes and modifications can be made which will achieve some of the advantages of embodiments without departing from the spirit and scope of the disclosure. Such modifications are intended to be covered by the appended claims.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments and what is described in the Abstract below, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of communicating an alert, the method comprising:
   encoding, by a central content controller (CCC), data received from a plurality of sources;
   determining existence of one or more alerts;
   if no alerts exist,
      assigning the encoded data as streams to a plurality of subchannels;
      transmitting the assigned streams to regional controllers (RCs) each associated with a respective market area (MA),
   else,
      determining a MA associated with each of the one or more alerts;
      for each MA having an alert:
         assigning the alert as a stream to a data subchannel of the plurality of subchannels;
         assigning the encoded data as streams to remaining ones of the plurality of subchannels; and
         transmitting the assigned streams to RCs associated with MAs for which the alert is applicable, the transmitted streams including the stream assigned to the data subchannel and the streams assigned to the remaining subchannels,
      for each MA without an applicable alert:
         assigning the encoded data as streams to the plurality of subchannels;
         transmitting the assigned streams to RCs each associated with a respective MA, and
   broadcasting, by each of the RCs, streams received by the respective RC to the associated MAs via an over the air (OTA) interface.

2. The method of claim 1, further comprising:
   generating an alert in a MA at which the alert is applicable; and
   communicating the alert from the MA to the CCC over a public or a private network.

3. The method of claim 2, further comprising:
   encoding the alert prior to assigning the alert to a subchannel.

4. The method of claim 1, further comprising:
   receiving, via an antenna associated with a viewer premises, the signals broadcast by the RC.

5. The method of claim 4, further comprising:
   processing the received signals by a user device associated with a viewer premises; and
   presenting content of the received signals on a presentation device coupled to the user device.

6. The method of claim 5, further comprising:
rendering, by the user device, the received alert as a separate video layer over content being presented to the viewer.

7. The method of claim 6, further comprising:
replacing an audio portion corresponding to the content being presented with an audio portion of the alert.

8. The method of claim 1, further comprising:
encoding a universal resource location (URL) into the subchannel of the alert, the URL corresponding to a location of an audio portion of the alert.

9. The method of claim 1, further comprising:
assigning an audio portion of the alert as a stream to a separate subchannel.

10. The method of claim 1, wherein the alert assigned as a stream to the data subchannel is unencoded.

11. A system for communicating an alert, the system comprising:
a central content controller (CCC) configured to:
encode data received from a plurality of sources;
determine existence of one or more emergency alerts;
if no alerts exist,
assign the encoded data as streams to a plurality of subchannels; and
transmit the assigned streams to regional controllers (RCs) each associated with a respective market area (MA),
else,
determine a MA for each of the one or more emergency alerts;
for each MA having an active alert:
assign the alert as a stream to a data subchannel of the plurality of subchannels;
assign the encoded data as streams to remaining ones of the plurality of subchannels; and
transmit the assigned streams to RCs associated with a MA for which the alert is applicable, the transmitted streams including the stream assigned to the data subchannel and the streams assigned to the remaining subchannels,
for a MA without an applicable alert:
assign the encoded data as streams to the plurality of subchannels; and
transmit the assigned streams to RCs each associated with a MA, and
a plurality of RCs associated with respective MAs and each configured to:
receive the streams transmitted by the CCC; and
broadcast the received streams as AV signals to the associated MAs via an over the air interface (OTA).

12. The system of claim 11, wherein the CCC comprises:
a multiplexer for combining multiple data streams for transmission via a transmission link.

13. The system of claim 11, further comprising:
an antenna associated with each of the RCs for broadcasting the streams.

14. The system of claim 13, further comprising:
a user device having an antenna for receiving the broadcast streams.

15. The system of claim 14, wherein the user device further comprises:
a tuner for tuning the user device to one of a plurality of frequencies of the broadcast.

16. The system of claim 15, wherein the user device further comprises:
a demultiplexer for demultiplexing the received streams.

17. The system of claim 16, wherein the user device further comprises:
a rendering module for rendering the alert on an overlayer above content being presented on a display communicatively coupled to the user device.

18. The system of claim 11, wherein the data subchannel of the plurality of subchannels is dedicated to alerts.

19. The system of claim 11, wherein the plurality of subchannels correspond to one frequency.

20. A non-transitory computer readable medium containing program instructions for communicating an alert, wherein execution of the program instructions by one or more processors of one or more computer systems causes the one or more processors to carry out the steps of:
encode data received from a plurality of sources;
determine existence of one or more alerts;
if no alerts exist,
assign the encoded data as streams to a plurality of subchannels;
transmit the assigned streams to regional controllers (RCs) each associated with a respective market area (MA),
else,
determine a MA associated with each of the one or more alerts;
for each MA having an active alert:
assign the alert as a stream to a data channel of the plurality of subchannels;
assign the encoded data as streams to remaining ones of the plurality of subchannels; and
transmit the assigned streams to RCs associated with MAs for which the alert is applicable, the transmitted streams including the stream assigned to the data subchannel and the streams assigned to the remaining subchannels,
for each MA without an applicable alert:
assign the encoded data as streams to the plurality of subchannels;
transmit the assigned streams to RCs each associated with a respective MA for broadcast via an over the air interface (OTA) to the associated MAs.

* * * * *